United States Patent
Lee et al.

(10) Patent No.: US 10,775,287 B2
(45) Date of Patent: Sep. 15, 2020

(54) ASSESSMENT METHOD FOR POLYETHYLENE RESIN

(71) Applicant: LG Chem, Ltd., Seoul (KR)

(72) Inventors: Hyun Sup Lee, Daejeon (KR); Sung Hyun Park, Daejeon (KR); Joong Soo Kim, Daejeon (KR); Dae Sik Hong, Daejeon (KR); Myung Han Lee, Daejeon (KR); Young Suk You, Daejeon (KR)

(73) Assignee: LG Chem, Ltd. (KR)

( * ) Notice: Subject to any disclaimer, the term of this patent is extended or adjusted under 35 U.S.C. 154(b) by 222 days.

(21) Appl. No.: 16/082,725

(22) PCT Filed: Nov. 3, 2017

(86) PCT No.: PCT/KR2017/012422
§ 371 (c)(1),
(2) Date: Sep. 6, 2018

(87) PCT Pub. No.: WO2018/097508
PCT Pub. Date: May 31, 2018

(65) Prior Publication Data
US 2019/0086308 A1    Mar. 21, 2019

(30) Foreign Application Priority Data
Nov. 24, 2016 (KR) .................. 10-2016-0157722

(51) Int. Cl.
| | |
|---|---|
| *G01N 3/18* | (2006.01) |
| *C08F 10/02* | (2006.01) |
| *G01N 37/00* | (2006.01) |
| *G02B 1/04* | (2006.01) |

(52) U.S. Cl.
CPC .............. *G01N 3/18* (2013.01); *C08F 10/02* (2013.01); *G01N 37/00* (2013.01); *G02B 1/04* (2013.01); *C08F 2500/02* (2013.01); *C08F 2500/07* (2013.01); *C08F 2500/13* (2013.01); *G01N 2203/0071* (2013.01); *G01N 2203/0092* (2013.01); *G01N 2203/0218* (2013.01)

(58) Field of Classification Search
CPC .... G01N 3/18; G01N 2203/0071; G02B 1/04; C08F 10/02; C08F 2500/02; C08F 2500/07; C08F 2500/13
See application file for complete search history.

(56) References Cited

U.S. PATENT DOCUMENTS

| | | | |
|---|---|---|---|
| 5,981,643 A | 11/1999 | Datta et al. | |
| 6,841,621 B2* | 1/2005 | Krumpel .............. | C08L 23/0815 525/191 |
| 2006/0154011 A1 | 7/2006 | Bettonville et al. | |
| 2007/0298508 A1* | 12/2007 | DesLauriers .......... | C08F 10/00 436/85 |
| 2010/0121006 A1* | 5/2010 | Cho ...................... | C08F 210/16 526/90 |
| 2011/0268952 A1 | 11/2011 | Eem Van Der et al. | |
| 2012/0148776 A1 | 6/2012 | Mannebach et al. | |
| 2012/0172548 A1* | 7/2012 | Cho ...................... | C08F 210/16 526/64 |
| 2013/0260624 A1 | 10/2013 | Rastogi et al. | |
| 2013/0280462 A1 | 10/2013 | Kuzuba et al. | |
| 2017/0002116 A1* | 1/2017 | Layman ................. | C08F 6/008 |

FOREIGN PATENT DOCUMENTS

| | | |
|---|---|---|
| CN | 102482379 A | 5/2012 |
| JP | H06293812 A | 10/1994 |
| JP | H08247862 A | 9/1996 |
| JP | H09286820 A | 11/1997 |
| JP | 2001520246 A | 10/2001 |
| JP | 3537333 B2 | 6/2004 |
| JP | 2004263119 A | 9/2004 |
| JP | 2005097383 A | 4/2005 |
| JP | 2008114819 A | 5/2008 |
| JP | 20090128331 A | 6/2009 |
| JP | 2012514672 A | 6/2012 |
| JP | 2012144724 A | 8/2012 |
| JP | 5137785 B2 | 2/2013 |
| JP | 5216566 B2 | 6/2013 |
| JP | 2013204720 A | 10/2013 |
| JP | 2014019806 A | 2/2014 |
| JP | 2014504311 A | 2/2014 |
| JP | 2014133880 A | 7/2014 |
| JP | 2015203682 A | 11/2015 |
| KR | 101131029 B1 | 3/2012 |
| KR | 101407405 B1 | 6/2014 |
| KR | 20160003243 A | 1/2016 |
| WO | 2014177547 A1 | 11/2014 |
| WO | 2015101667 A1 | 7/2015 |

OTHER PUBLICATIONS

Adib et al., "The Effect of Microstructure on the Slow Crack Growth Resistance in Polyethylene Resins", Polymer Engineering and Science, May 1, 2015, vol. 55, No. 5, pp. 1018-1023, XP055627676.
Extended European Search Report including Written Opinion for Application No. EP17873091.7 dated Oct. 9, 2019.
Cazenave, et al., "Short-Term Mechanical and Structural Approaches for the Evaluation of Polyethylene Stress Crack Resistance", Polymer, vol. 47, No. 11, May 2006, pp. 3904-3914.
International Search Report for Application No. PCT/KR2017/012422, dated Feb. 12, 2018.

* cited by examiner

*Primary Examiner* — Francis C Gray
(74) *Attorney, Agent, or Firm* — Lerner, David, Littenberg, Krumholz & Mentlik, LLP

(57) ABSTRACT

The present disclosure relates to an assessment method for a polyethylene resin, and more specifically to a new assessment method for a polyethylene resin which can accurately determine long-term durability of a molded article by using physical properties that are easily measurable in a short time.

7 Claims, No Drawings

ASSESSMENT METHOD FOR POLYETHYLENE RESIN

CROSS REFERENCE TO RELATED APPLICATIONS

This application is a national phase entry under 35 U.S.C. § 371 of International Application No. PCT/KR2017/012422, filed on Nov. 3, 2017, which claims priority to Korean Patent Application No. 10-2016-0157722 filed on Nov. 24, 2016, the disclosures of which are incorporated herein by reference.

TECHNICAL FIELD

The present disclosure relates to an assessment method for a polyethylene resin, and more specifically to a new assessment method for a polyethylene resin, which can accurately determine long-term durability of a molded article by using physical properties that are easily measurable in a short time.

BACKGROUND OF ART

Thermoplastics are a type of polymer compounds that can be formed using heat and/or pressure. They are easy to process, melt when heated, and return to a solid state when the temperature is sufficiently lowered.

Thermoplastics are easy to process in various forms, and some of them can be recycled. Therefore, in modern society, various kinds of plastic molded products are used.

These plastics are generally obtained by polymerizing monomer compounds. The polymerized resin or resin composition is processed into pellets and stored, followed by molding using various methods depending on each application to produce products.

Among these, the polyethylene resin is widely used in various fields such as those utilizing films, sheets, and pipes, since it has excellent mechanical properties such as stiffness, impact resistance, environmental stress crack resistance (ESCR), and elongation characteristics, and is also excellent in chemical resistance, corrosion resistance, and electrical properties.

Particularly, when the polyethylene resin is used for a hollow molded article, a coated product, a pipe, or the like, physical properties such as corrosion resistance and long-term durability are considered to be important. In particular, in case of a pipe or the like, long-term durability of at least 20 years, generally 50 years or more, is required.

For a thinly processed polyethylene resin product, it is common to increase density of the polyethylene resin in order to maintain the strength required for the product. Since the polyethylene resin having high density tends to have low long-term durability, it is not easy to maintain long-term durability at a certain level while maintaining the strength of the product.

Because of these characteristics, the properties related to the long-term durability of the polyethylene resin should be accurately measured and evaluated. In general, in order to measure the long-term durability of the polyethylene resin by a conventional method, a long time, usually 500 hours or more, or 1000 hours or more, is required, which is a main factor for delaying product development.

DETAILED DESCRIPTION OF THE INVENTION

Technical Problem

The present disclosure provides an assessment method for a polyethylene resin, which can accurately determine long-term durability of a molded article by using physical properties that are easily measurable in a short time.

Technical Solution

The present disclosure provides an assessment method for a polyethylene resin, including the steps of:
deriving a maximum stress of a polyethylene resin specimen at which permanent deformation does not occur within 1200 seconds;
measuring a tie molecule fraction and an entanglement molecular weight (Me) of the polyethylene resin;
deriving a significance factor with respect to a full notch creep test (FNCT) time from a relationship of the tie molecular fraction and the entangled molecular weight; and
predicting a full notch creep test (FNCT) time value of a molded article of the polyethylene resin using the maximum stress and the significance factor with respect to the full notch creep test (FNCT) time.

Advantageous Effects

The present disclosure provides an assessment method for a polyethylene resin, which can accurately determine long-term durability of a molded article by using physical properties that are easily measurable in a short time.

DETAILED DESCRIPTION OF THE EMBODIMENTS

The assessment method for a polyethylene resin of the present disclosure includes the steps of:
deriving a maximum stress of a polyethylene resin specimen at which permanent deformation does not occur within 1200 seconds;
measuring a tie molecule fraction and an entanglement molecular weight (Me) of the polyethylene resin;
deriving a significance factor with respect to a full notch creep test (FNCT) time from a relationship of the tie molecular fraction and the entangled molecular weight; and
predicting a full notch creep test (FNCT) time value of a molded article of the polyethylene resin using the maximum stress and the significance factor with respect to the full notch creep test (FNCT) time.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, these are not intended to limit the present invention to the particular forms disclosed, and it should be understood that the present invention includes all modifications, equivalents, and replacements within the idea and technical scope of the present invention.

Throughout this disclosure, an ethylene (co)polymer conceptually includes both ethylene homopolymers and/or copolymers of ethylene and alpha-olefins.

In the present disclosure, a polyethylene resin refers to a resin containing the ethylene (co)polymer, and conceptually includes all resin compositions in which additives that are well-known in the art can be further added to such homopolymers or copolymers.

In addition, in the present disclosure, the step of deriving a maximum stress at which permanent deformation does not occur within 1200 seconds determines a maximum value of the stress at which permanent deformation of the polyethylene resin specimen does not occur within a test time of 1200 seconds, when the full notch creep test (FNCT) of the polyethylene resin specimen is repeatedly performed under different stress conditions.

Hereinafter, the assessment method for a polyethylene resin of the present disclosure will be described in more detail.

The assessment method for a polyethylene resin according to an embodiment of the present disclosure includes the steps of:

deriving a maximum stress of a polyethylene resin specimen at which permanent deformation does not occur within 1200 seconds;

measuring a tie molecule fraction and an entanglement molecular weight (Me) of the polyethylene resin;

deriving a significance factor with respect to a full notch creep test (FNCT) time from a relationship of the tie molecular fraction and the entangled molecular weight; and predicting a full notch creep test (FNCT) time value of a molded article of the polyethylene resin using the maximum stress and the significance factor with respect to the full notch creep test (FNCT) time.

The ethylene (co)polymer is a semi-crystalline polymer and may include crystalline regions and amorphous regions. Specifically, the crystalline region may include a lamellar crystal containing an ethylene repeating unit or an alpha-olefin repeating unit. More specifically, the polymer chain including the ethylene repeating unit or the alpha-olefin repeating unit is folded to form a bundle, thereby forming a crystalline block (or a segment) in the form of a lamellar. The lamellar crystal means a crystalline block in the form of a lamella, and mechanical properties of the ethylene (co) polymer can be obtained through the lamellar crystal.

The ethylene repeating unit means a repeating unit contained in a homopolymer of an ethylene monomer, and the alpha-olefin repeating unit means a repeating unit contained in a homopolymer of an alpha-olefin monomer. Specific examples of the alpha-olefin monomer include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, and the like, and two or more of them may be used.

On the other hand, a large number of the lamellar crystals can be gathered to form a three-dimensional spherulite. In this case, an outside part of the lamellar crystal corresponds to an amorphous region. More specifically, the amorphous region consists of cilia where the chain begins at the crystalline region and ends at the amorphous region, a loose loop where the chain links one lamella, and an inter-lamellar link where the chain links two lamellae. One of these inter-lamellar links is a tie molecule that links two lamellae. That is, the tie molecule mediates a bond between the lamellar crystal in the spherulite-formed ethylene (co)polymer and the lamellar crystal. Elastic properties of the ethylene (co)polymer can be obtained due to this amorphous region.

That is, the ethylene (co)polymer may include a lamellar crystal containing an ethylene repeating unit or an alpha-olefin repeating unit, and a tie molecule mediating a bond between the lamellar crystals. The tie molecule mediating binding between the lamellar crystals means that one end of the tie molecule binds to one lamellar crystal, and the other end of the tie molecule binds to another lamellar crystal, so that two or more lamellar crystals are linked by the tie molecule.

The tie molecule fraction can be derived from the following Equation 1, based on the content of the ethylene (co)polymer.

$$\bar{P} = \frac{\int_0^\infty nP dM}{\int_0^\infty n dM} \quad \text{[Equation 1]}$$

In Equation 1, n is dw/dM (wherein M is a molecular weight of the ethylene (co)polymer), P can be calculated from Equation 2, dM is d log M «which is x-axis data of a GPC curve, X n+1» minus d log M «which is x-axis data of a GPC curve, Xn».

$$P = \frac{1}{3} \frac{\int_{2l_c+l_a}^\infty r^2 \exp(-b^2 r^2) dr}{\int_0^\infty r^2 \exp(-b^2 r^2) dr} \quad \text{[Equation 2]}$$

In Equation 2,
r is an end-to-end distance of a random coil,
$b^2$ is $3/2<r>^2$, and
$l_c$ is a crystal thickness of the following Equation 3.

$$T_m = T_m^\circ \left(1 - \frac{2\sigma_e}{\Delta h_m l}\right) \quad \text{[Equation 3]}$$

In Equation 3, Tm is a melting point of the ethylene (co)polymer, $T_m^0$ is 415 K, $\sigma_e$ is $60.9 \times 10^{-3}$ Jm$^{-2}$, $\Delta h_m$ is $2.88 \times 10^8$ Jm$^{-3}$, $l_a$ is an amorphous layer thickness of the following Equation 4, and <r> can be calculated by $2 \times l_c + l_a$.

$$l_a = \rho_c l_c (1-\omega^c)/\rho_a \omega^c \quad \text{[Equation 4]}$$

In Equation 4, $\rho_c$ is a density of a crystalline phase and is 1000 kg/m$^3$, $\rho_a$ is a density of an amorphous phase and is 852 kg/m$^3$, and $\omega^c$ is a weight fraction of the crystalline phase.

In addition, the ethylene (co)polymer of the present disclosure may have a lamellar crystal surface area of $3.0 \times 10^{-9}$ m$^2$/mol to $9.0 \times 10^{-9}$ m$^2$/mol, or $3.5 \times 10^{-9}$ m$^2$/mol to $5.0 \times 10^{-9}$ m$^2$/mol.

As described above, the ethylene (co)polymer is a semi-crystalline polymer, and its crystal structure includes lamellar crystals, while the tie molecule mediates a bond between the lamellar crystals. Therefore, the whole crystal is bound by the tie molecule, and this tie molecule can affect the properties of the ethylene (co)polymer.

The lamellar crystal surface area refers to a surface area of the lamellar structure in the ethylene (co)polymer crystal structure, and the higher the lamellar crystal surface area, the more the tie molecules linking the crystal structures, which shows increased crack resistance. Therefore, the ethylene (co)polymer according to the present disclosure is characterized in that it has excellent environmental stress crack resistance due to the high lamellar crystal surface area.

The lamellar crystal surface area can be derived according to the following Equation 5.

A lamellar crystal surface area (m²/mol)=a weight average molecular weight (kg/mol)/[density of crystalline phase (kg/m³)×crystal thickness (m)]   [Equation 5]

In Equation 5, the weight average molecular weight can be determined by gel permeation chromatography (GPC) analysis of the ethylene (co)polymer, and refers to, for example, a weight average molecular weight using polystyrene calibration measured by a GPC method. In the process of measuring the weight average molecular weight using polystyrene calibration measured by a GPC method, a well-known analyzer, a detector such as a refractive index detector, and an analyzing column may be used. In addition, conventionally applied temperature conditions, solvents, and flow rates may be used. As a specific example of the measurement conditions, a temperature of 160° C., a trichlorobenzene solvent, and a flow rate of 1 mL/min may be applied.

The density of the crystalline phase is 1000 kg/m³ as a documented value, and the crystal thickness can be obtained by Equation 3 which is the measurement of the tie molecule fraction.

The entanglement molecular weight (Me) represents an average molecular weight between entanglement points of the ethylene (co)polymer chains. The lower the entanglement molecular weight, the higher the degree of entanglement of the ethylene (co)polymer chains, which means better resistance to deformation due to external force, and crack resistance. Therefore, the ethylene (co)polymer according to the present disclosure has excellent long-term durability due to the low entanglement molecular weight.

In general, processability and long-term durability are conflicting properties, and if a melt index or melt flow rate ratio is increased in order to improve processability, the durability is deteriorated. However, the ethylene (co)polymer of the present disclosure can have long-term durability due to its low entanglement molecular weight, with good processability.

The entanglement molecular weight (Me) can be derived according to the following Equation 6.

$$M_e = \frac{\rho RT}{G_N^0}$$   [Equation 6]

In Equation 6, $G^0_N$ is a plateau modulus, $\rho$ is a melt density, R is a gas constant, and T is an absolute temperature.

In addition, the plateau modulus $G^0_N$ is inversely proportional to $J_o$, which is an intercept value of creep compliance, and can be obtained from the following Equation 7.

$G^0_N = 6/(5J_o)$   [Equation 7]

In Equation 7, $J_o$ can be measured by DHR-2 equipment (manufactured by TA Instruments) using a plate having a diameter of 25 mm as follows.

First, the ethylene (co)polymer sample is melted under a nitrogen atmosphere at a temperature of 190° C., and placed between 25 mm flat plates so that the thickness of the ethylene (co)polymer sample is 2 mm. After waiting for 2 minutes so that the temperature is stabilized, the stress in the vertical direction which occurs as the sample is compressed is removed. A shear stress of 1 Pa is applied to the molten sample for 1000 seconds. In the graph in which the creep compliance J, which is the value obtained by dividing the deformation amount of the ethylene (co)polymer after the end of the measurement by the applied shear stress, is taken as a y-axis and the time t is taken as an x-axis, $J_o$ is obtained by using a tangent line in a certain section where the creep compliance reaches a steady state and the slope is constant.

The inventors of the present disclosure found that long-term durability of an actual product including the polyethylene resin can be predicted in an easy and simple manner that is similar to the conventional method by measuring and using the maximum stress of the polyethylene resin specimen at which permanent deformation occurs under a specific condition, the tie molecule fraction, and the entanglement molecular weight.

As described above, the step of deriving a maximum stress of a polyethylene resin specimen at which permanent deformation does not occur within 1200 seconds can be carried out by deriving a maximum value of the stress at which permanent deformation of the polyethylene resin specimen does not occur within a test time of 1200 seconds, when the full notch creep test (FNCT) of the polyethylene resin specimen is repeatedly tested under different stress conditions at about 80° C. to about 85° C. (preferably about 85° C.).

The permanent deformation measurement for the polyethylene resin specimen may preferably be conducted under a condition of about 2.4 MPa to about 10.0 MPa. Specifically, it may be preferable to apply a stress load of various values within the above-mentioned range to each specimen, and proceed simultaneously. However, the present disclosure is not limited thereto, and can be determined according to characteristics of the polyethylene resin specimen to be tested.

Further, the maximum stress of the polyethylene resin specimen may be about 5.0 MPa or more, preferably about 5.5 MPa, more preferably about 6.0 MPa. At this time, the upper limit of the maximum stress is not particularly significant, and may vary depending on characteristics of the polyethylene resin, but may be about 20 MPa or less.

That is, when the maximum stress of the polyethylene resin specimen is about 5.0 MPa or more, the long-term durability value according to the standard measurement method, which is the FNCT value under a stress of about 4.0 MPa, can be simply predicted to be about 500 hours or more. In addition, when the maximum stress of the polyethylene resin specimen is about 5.5 MPa or more, the FNCT value according to the standard measurement method can be predicted to be about 500 hours or more, and when the maximum stress is about 6.0 MPa or more, the FNCT value according to the standard measurement method can be simply predicted to be about 750 hours or more, or about 1000 hours or more.

Therefore, it is most preferable for the permanent deformation measurement for the polyethylene resin specimen to be carried out under a condition of 6.0 MPa.

However, the above prediction is predicated on an assumption that when the durability of the specimen under a severe stress condition is excellent, the long-term durability will also be excellent even under a relatively less severe condition. Therefore, it is difficult to more accurately predict the long-term durability of actual polyethylene resin specimens or polyethylene products.

In order to compensate for the above, in the present disclosure, the long-term durability of the polyethylene resin can be more accurately predicted by measuring not only the maximum stress but also the tie molecule fraction and the entanglement molecular weight.

Specifically, the step of deriving a significance factor of the FNCT may be conducted by using the following Equation 1-1.

$$Fc = 0.23(Me^{-0.19}) \times (Tie^{3.99}) \quad \text{[Equation 1-1]}$$

In Equation 1-1,

Me is an entanglement molecular weight of the polyethylene resin,

Tie is a tie molecule fraction (%) of the polyethylene resin, and

Fc is a significance factor of the FNCT of the polyethylene resin.

According to an embodiment of the present disclosure, it is preferable that the step of predicting a full notch creep test (FNCT) time value of a molded article of the polyethylene resin is conducted by using the following Equation 1-2.

$$\log(Fn) = A \times \log(Fc) - B \quad \text{[Equation 1-2]}$$

In Equation 1-2, log is a common logarithm,

Fn is a minimum FNCT value of the polyethylene resin specimen predicted by the equation, Fc is the significance factor of the FNCT of the polyethylene resin, calculated in Equation 1-1, A is an FNCT coefficient and is about 1.15 to about 1.20, and B is an FNCT intercept value and is about 0.5 to about 0.6.

The A and B are values determined by previously tested standard specimens. More preferably, the A may be about 1.17 to about 1.18, and the B may be about 0.53 to about 0.55, but they are not limited thereto, and may be varied depending on characteristics of the polyethylene resin to be measured.

In the present disclosure, the significance factor directly related to the FNCT can be derived through the entanglement molecular weight and the tie molecule fraction of the polyethylene resin. When the derived significance factor is equal to or greater than a predetermined value, preferably when the Fc value is about 750 or more, or about 760 or more, the predicted value of the FNCT which is calculated from the significance factor can be derived.

The Fn value calculated from the above equation is a value that can be guaranteed to be the minimum for the actual polyethylene resin sample or product, and the actual FNCT value of the polyethylene resin sample or product is necessarily larger than the Fn value calculated from the above equation.

That is, the long-term durability value (FNCT) required in a widely used polyethylene product is about 500 hours or more, or 700 hours or more, and preferably about 1000 hours or more, under a condition of about 4 MPa as described above. Therefore, a standard measurement method of the full notch creep test (FNCT) for testing whether the polyethylene resin has a quality of the required long-term durability also takes a corresponding time. However, in the present disclosure, the measurement can be completed within a very short time, specifically within about 1200 seconds, by measuring the maximum stress under different stress conditions for the prepared polyethylene resin specimen. In addition, the long-term durability of a molded product actually produced can be relatively accurately calculated by calculating the predicted FNCT value using the entanglement molecular weight, the tie molecule fraction, and the predetermined equations.

According to an embodiment of the present disclosure, the polyethylene resin may have a density of about 0.930 g/cm$^3$ to about 0.965 g/cm$^3$, or about 0.935 g/cm$^3$ to about 0.955 g/cm$^3$.

In addition, the polyethylene resin may have a weight average molecular weight of about 85,000 g/mol to about 150,000 g/mol, or about 100,000 g/mol to about 120,000 g/mol.

Further, the polyethylene resin may have an entanglement molecular weight (Me) of about 50 g/mol to about 50,000 g/mol, and a tie molecule fraction of about 0.01 to about 0.20.

However, the measurement method of the present disclosure is not necessarily limited to the physical properties of the polyethylene resin described above.

In the ethylene (co)polymer, the content of the comonomer, an alpha-olefin, is not particularly limited and may be appropriately selected. More specifically, it may be more than 0 and 99 mol % or less.

Examples of the method for preparing the ethylene (co) polymer are not limited, but can be prepared using, for example, a supported metallocene catalyst or a hybrid supported metallocene catalyst.

Particularly, a supported catalyst of a metallocene compound containing a Group 4 transition metal, or a catalyst in which two or more metallocene compounds are mixed and supported, forms a cross-linked structure by a bridge and can exhibit high polymerization activity by having a pair of non-covalent electrons capable of acting as a Lewis base in a ligand structure. In addition, the ethylene (co)polymer can exhibit high comonomer incorporation in a high molecular weight region.

When the metallocene compound with this structure is supported on a support, the —(CH$_2$)n-OR group of the substituent can form a covalent bond through close interaction with a silanol group on the surface of the silica used as the support, thereby enabling stable supported polymerization. In addition, the functional group may affect copolymerization of alpha-olefin comonomers such as 1-butene or 1-hexene. When n of —(CH$_2$)n-OR is 4 or less, a short alkyl chain, comonomer incorporation of the alpha-olefin comonomer, is lowered while maintaining the overall polymerization activity, which is advantageous for the preparation of the ethylene (co)polymer having controlled comonomer incorporation without deteriorating other physical properties.

In the hybrid supported metallocene catalyst according to the present disclosure, a cocatalyst may be supported on the support to activate the metallocene compound. The cocatalyst is an organometallic compound containing a Group 13 metal, and is not particularly limited as long as it can be used in the polymerization of olefins in the presence of a general metallocene catalyst.

By using the first and second cocatalysts, molecular weight distribution of the prepared ethylene (co)polymer becomes more uniform, and the polymerization activity can be improved.

In the supported metallocene catalyst, as the support, those containing hydroxyl groups on the surface may be used. Preferably, supports containing hydroxyl groups or siloxane groups having high reactivity by removing moisture on the surface by drying may be used.

For example, silica, silica-alumina, silica-magnesia, and the like dried at a high temperature may be used, and may commonly contain oxides, carbonates, sulfates, and nitrates such as $Na_2O$, $K_2CO_3$, $BaSO_4$, $Mg(NO_3)_2$, and the like.

The drying temperature of the support may preferably be 200 to 800° C., more preferably 300 to 600° C., and most preferably 300 to 400° C. If the drying temperature of the support is less than 200° C., surface moisture may react with the cocatalyst due to excessive moisture. If it is greater than 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The ethylene (co)polymer can be prepared by polymerizing an ethylene and an alpha-olefin in the presence of the above-described supported metallocene catalyst or hybrid supported metallocene catalyst.

The polymerization can be carried out by copolymerizing an ethylene and an alpha-olefin using a continuous slurry polymerization reactor, a loop slurry reactor, a gas phase reactor, or a solution reactor.

Specifically, the ethylene is injected into the reactor in a gaseous state, and the alpha-olefin can be injected into the reactor in a liquid state. At this time, the volume of the alpha-olefin may be 8 ml or more, 8 ml to 50 ml, or 8 ml to 30 ml. If the volume of the alpha-olefin is reduced to less than 8 ml, the density of the finally obtained ethylene/alpha-olefin increases, the tie molecule fraction decreases, the lamellar crystal surface area decreases, and the entanglement molecular weight increases, thereby causing a problem that the environmental stress crack resistance is reduced.

On the other hand, when the ethylene is injected into the reactor in a gaseous state, the pressure of ethylene may be 10 $Kgf/cm^2$ or more, or 10 $Kgf/cm^2$ to 20 $Kgf/cm^2$. If the pressure of ethylene is reduced to less than 10 $Kgf/cm^2$, the weight average molecular weight or Z average molecular weight of the finally obtained ethylene/alpha-olefin decreases, the lamellar crystal surface area decreases, and the entanglement molecular weight increases, thereby causing a problem that the long-term durability decreases.

At this time, in a single reactor optionally containing a molecular weight regulator, the polymerization can proceed by feeding the ethylene and the alpha-olefin.

Further, olefinic monomers may be fed in the presence of hydrogen gas to proceed with the polymerization.

Here, the hydrogen gas acts to suppress an abrupt reaction of the metallocene catalyst at an initial stage of polymerization, so that an ethylene (co)polymer with a high molecular weight can be prepared in a large amount. Therefore, the ethylene (co)polymer of the present disclosure can be effectively obtained by controlling the use and the amount of the hydrogen gas.

The hydrogen gas may be injected such that the molar ratio of the hydrogen gas to the olefinic monomer is about 1:100 to 1:1000. If the amount of the hydrogen gas is too small, catalytic activity may not be sufficiently realized and the preparation of an ethylene (co)polymer having desired properties may become difficult. If an excessively large amount of hydrogen gas is injected, catalytic activity may not be sufficiently realized.

On the other hand, an organoaluminum compound may be further added to remove moisture in the reactor, and the polymerization reaction can proceed in the presence of the same. Specific examples of the organoaluminum compound include trialkylaluminum, dialkylaluminum halide, alkylaluminum dihalide, aluminum dialkylhydride, and alkylaluminum sesquihalide. The organoaluminum compound may be continuously added into the reactor, and may be introduced at a rate of about 0.1 to 10 mol per kilogram of reaction medium charged to the reactor for proper moisture removal.

In addition, the polymerization temperature may be about 25 to about 500° C., about 25 to about 200° C., or about 50 to about 150° C. The polymerization pressure may be about 1 to about 100 $Kgf/cm^2$, about 1 to about 50 $Kgf/cm^2$, or about 5 to about 30 $Kgf/cm^2$.

The ethylene (co)polymer has appropriately controlled ranges of three factors (crystal surface area, entanglement molecular weight, and tie molecule fraction based on the ethylene (co)polymer content) that may affect the improvement in long-term durability. Therefore, the polymer can have high long-term durability as the structure is optimized, and can be preferably used as a pipe requiring long-term durability under various environmental conditions.

Hereinafter, the function and effect of the present invention will be described in more detail through specific examples of the present invention. However, these examples are for illustrative purposes only, and the invention is not intended to be limited by these examples.

EXAMPLES

The polyethylene resin having physical properties shown in the following Table 1 was synthesized by a supported metallocene catalyst. The polyethylene resin was dried overnight in a 40° C. vacuum oven, and then made into pellets using a twin screw extruder (BA-19, manufactured by BAUTECH).

The pellet-shaped resin obtained by compression was dried again in a 40° C. vacuum oven overnight, and then pressed using a hot press at 200° C. and 20 MPa for 5 minutes to prepare a sheet. Subsequently, it was punched with a blade to prepare a bar specimen with a 6 mm width and a 0.3 mm thickness.

For each specimen, a DMA (Dynamic Mechanical Analyzer, manufactured by TA, Q800), a stress tester, was used to observe the occurrence of permanent deformation over time at 85° C. with different stresses. Among them, it was checked whether permanent deformation occurred within 1200 seconds at 6 MPa. When permanent deformation occurred, it was evaluated as X, and when no permanent deformation occurred, it was evaluated as 0.

Further, in each example, the entanglement molecular weight (Me) and the tie molecule fraction of the polyethylene resin were measured and calculated, followed by calculating the Fc and Fn values.

The results are summarized in Table 1 below in comparison with the FNCT time value measured under the same conditions as above except at 4 MPa for the same polyethylene resin specimen (according to the measured value of the standard specimen, the FNCT coefficient A in Equation 1-2 was determined to be 1.174, and the FNCT intercept value B was determined to be 0.5491).

TABLE 1

|  | 6 MPa | Me (g/mol) | Tie (%) | Fc | Fn (hours) | FNCT (hours) |
|---|---|---|---|---|---|---|
| Example 1 | O | 1720 | 11.2 | 857.74 | 784.62 | >1000 |
| Example 2 | X | 759 | 11.0 | 932.48 | 865.48 | 511 |
| Example 3 | X | 1950 | 10.5 | 647.40 | 563.91 | 498 |
| Example 4 | X | 6054 | 11.4 | 724.75 | 643.82 | 383 |

TABLE 1-continued

|  | 6 MPa | Me (g/mol) | Tie (%) | Fc | Fn (hours) | FNCT (hours) |
|---|---|---|---|---|---|---|
| Example 5 | ○ | 90 | 10.6 | 1206.12 | 1170.72 | >1000 |
| Example 6 | X | 141 | 9.5 | 715.31 | 633.98 | 706 |
| Example 7 | X | 35250 | 7.2 | 82.89 | 50.49 | 80 |
| Example 8 | X | 5313 | 9.6 | 397.26 | 296.35 | 365 |
| Example 9 | ○ | 3230 | 11.5 | 845.60 | 771.60 | 843 |

Referring to Table 1, when the polyethylene resin specimen meets the maximum stress of 6 MPa in which permanent deformation does not occur within 1200 seconds at 85° C., it can be confirmed that the predicted value of the FNCT derived from the entanglement molecular weight (Me) value and tie molecule fraction (Tie) value, which is the Fn value, is substantially similar to the actual FNCT value.

More specifically, when the significance factor value (Fc) of the FNCT derived from the entanglement molecular weight and the tie molecule fraction of the polyethylene resin is calculated as about 750 or more, it can be confirmed that the actual FNCT value is measured at the predicted value Fn or more. More specifically, it can be confirmed that a relatively accurate prediction is possible for the case of having the FNCT value of about 700 hours or more.

However, when permanent deformation occurs within 1200 at a pressure of 6 MPa, not only is the FNCT value of the polyethylene resin itself significantly decreased but also the accuracy of the Fn value calculated and predicted from the entanglement molecular weight and the tie molecular fraction is significantly lowered. Moreover, a case where the actual FNCT value is smaller than the Fn value also occurs, so it can be confirmed that the reliability of the prediction method is inferior.

The invention claimed is:

1. An assessment method for a polyethylene resin, comprising the steps of:
    deriving a maximum stress of a polyethylene resin specimen at which permanent deformation does not occur within 1200 seconds;
    measuring a tie molecule fraction and an entanglement molecular weight (Me) of the polyethylene resin;
    deriving a significance factor with respect to a full notch creep test (FNCT) time from a relationship of the tie molecular fraction and the entangled molecular weight; and
    predicting a full notch creep test (FNCT) time value of a molded article of the polyethylene resin using the maximum stress and the significance factor with respect to the full notch creep test (FNCT) time.

2. The assessment method for a polyethylene resin of claim 1,
    wherein the measurement of the permanent deformation is carried out under a condition of 6.0 MPa.

3. The assessment method for a polyethylene resin of claim 1,
    wherein the step of deriving a significance factor of the FNCT is conducted by using the following Equation 1-1:

$$Fc = 0.23(Me^{-0.19}) \times (Tie^{3.99})$$

wherein, in Equation 1-1,
Me is an entanglement molecular weight of the polyethylene resin,
Tie is a tie molecule fraction (%) of the polyethylene resin, and
Fc is a significance factor of the FNCT of the polyethylene resin.

4. The assessment method for a polyethylene resin of claim 3,
    wherein the step of predicting a full notch creep test (FNCT) time value of a molded article of the polyethylene resin is conducted by using the following Equation 1-2:

$$\log(Fn) = A \times \log(Fc) - B \qquad \text{[Equation 1-2]}$$

wherein, in Equation 1-2,
log is a common logarithm,
Fn is a minimum FNCT value of the polyethylene resin specimen predicted by the equation,
Fc is the significance factor of the FNCT of the polyethylene resin, calculated in Equation 1-1,
A is a FNCT coefficient and is 1.15 to 1.20, and
B is a FNCT intercept value and is 0.5 to 0.6.

5. The assessment method for a polyethylene resin of claim 1,
    wherein the polyethylene resin has a density of 0.930 g/cm$^3$ to 0.965 g/cm$^3$.

6. The assessment method for a polyethylene resin of claim 1,
    wherein the polyethylene resin has a weight average molecular weight of 85,000 g/mol to 150,000 g/mol.

7. The assessment method for a polyethylene resin of claim 1,
    wherein the polyethylene resin has an entanglement molecular weight (Me) of 50 g/mol to 50,000 g/mol, and a tie molecule fraction of 0.01 to 0.20.

* * * * *